United States Patent [19]

Baker

[11] 4,018,722
[45] Apr. 19, 1977

[54] RECLAIMED PLASTIC MATERIAL

[75] Inventor: Carl Baker, Wickenburg, Ariz.

[73] Assignee: Elizabeth I. Bellack, Wickenburg, Ariz. ; a part interest

[22] Filed: Aug. 18, 1976

[21] Appl. No.: 715,314

Related U.S. Application Data

[63] Continuation-in-part of Ser. No. 556,696, March 10, 1975, abandoned.

[52] U.S. Cl. .................................................. 260/2.3
[51] Int. Cl.$^2$ ........................................ C08J 11/04
[58] Field of Search .................................... 260/2.3

[56] References Cited

UNITED STATES PATENTS

| | | | |
|---|---|---|---|
| 3,344,212 | 1/1965 | Francis .............................. | 260/2.3 |
| 3,523,493 | 8/1970 | Berry et al. .......................... | 260/2.3 |
| 3,687,873 | 8/1972 | Kropscott et al. ................... | 260/2.3 |

*Primary Examiner*—Murray Tillman
*Assistant Examiner*—T. DeBenedictis, Sr.
*Attorney, Agent, or Firm*—Warren F. B. Lindsley

[57] ABSTRACT

A method for producing a new composition of matter from nuisance plastics, i.e., spent or used plastic products by the combination during a heating process of shredded waste plastic materials with controlled amounts of certain ingredients including fats, sodium chloride (NaCl), sodium hydrogen carbonate (NaHCO$_3$) and sand comprising crushed mineral particles.

3 Claims, 1 Drawing Figure

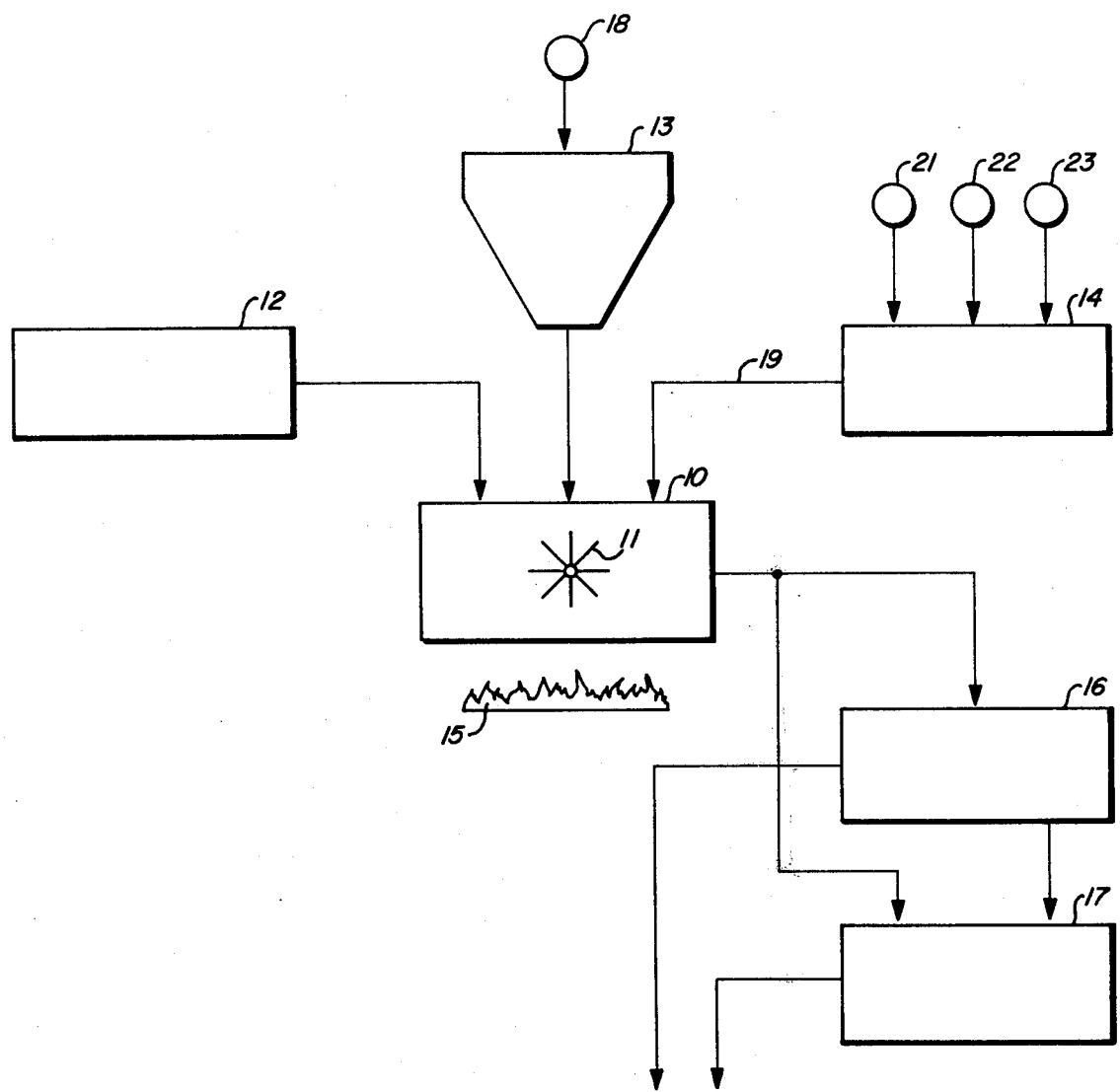

RECLAIMED PLASTIC MATERIAL

This application is a continuation-in-part of U.S. Patent application Ser. No. 556,696, filed Mar. 10, 1975, now abandoned, and entitled RECLAIMED PLASTIC MATERIAL.

BACKGROUND OF THE INVENTION

During the past century the plastics industry has brought into use a broad and varied range of wonder materials which are employed in nearly every major industry including the electrical, automotive, steel, railway, food-packaging, printing and textile industries. In all of these technological fields the by-words for low cost and mass production capability are "made of plastic". This wide use has resulted because of the wear resistance, flexibility, strength, resistance to water and acids, lightweight and low cost properties of these materials and also because of the many ways in which it may be worked or fabricated including, inter alia, molding, extrusion, laminating, casting and calendering.

Because of this universal popularity of plastic materials including their resistance to rust, rot and breaking down again into their natural forms, the disposal of worn-out plastic materials has become a challenging problem.

Plastics are a family of synthetic materials composed of extremely large molecules called polymers, which are synthesized from simpler molecules called monomers. The overall properties of a plastic are a result of the combined properties of all its molecules, such as their different sizes, their chemical structure and shape, and their ability to crystalize. Furthermore, the properties of plastic materials can be altered by mixing them with additives. Additives are mixed or compounded with the polymer to improve its processing characteristics and produce other desirable properties. The resulting product is then called compound or resin. Resin is a general term that also denotes additive-free polymer.

Polymers that soften when heated and can be shaped if heat and pressure are applied are called thermoplastics. Polymers that soften and can be shaped only during the first heating cycle and cannot be reformed are called thermosetting plastics. Since thermosetting plastics are not easily recycled, this invention is directed to thermoplastics, which today represent about 80 percent of all plastics. Some coatings and adhesives are thermoplastic, but they are impossible to recycle. When they are excluded, the percent of potentially recyclable thermoplastics remaining is 75 percent of all plastics, or approximately 15 billion pounds in 1970, i.e. five major thermoplastics; low-density polyethylene (LDPE), high-density polyethylene (HDPE), polypropylene, styrene polymers, and polyvinylchloride (PVC). These five represent 89 percent of all thermoplastics (excluding coatings and adhesives).

The term scrap plastic denotes all scrap that has value and is recycled, such as the scrap generated during the manufacture of resin and plastic items. This scrap may be in the form of contaminated compound, film trimmings, strands, or large chunks of plastic from the molding machinery.

Nuisance plastic is used to denote that portion of plastics production that has no value and is usually found in the disposal area. For example, the consumer generates nuisance plastic when he disposes of his spent plastic products, and, if the manufacturer cannot use his scrap, it also becomes nuisance plastic.

Nuisance plastics heretofore had no value. The consumer disposes of a plastic item after a certain lapse of time, which is the service life of the product. For example, packaging, novelties, disposables, etc., have a short service life (less than 1 year). Other items, such as furniture, sporting goods, and luggage have estimated service lives of 6 to 10 years, and products such as instruments, hardware, and various machinery can serve for 11 to 20 years. It is those plastic items having a short service life that are the major source of nuisance plastics in the disposal site today and, therefore, recycling of these should be promoted.

Packaging—a short service life product— is the major source of nuisance plastic. The plastic derived from packaging wastes generated by the five major thermoplastics accounted for 60 percent (weight) of the 6.5 billion pounds of all nuisance plastic in the disposal area in 1970. Assuming that conditions and technology remain unchanged, it's estimated that plastic packaging wastes will still dominate the disposal area in 1980 when they will be equivalent to 10 billion pounds or 54 percent of all nuisance plastics. If the plastic beverage container becomes a reality, plastic packaging wastes could increase to 12 billion pounds by 1980, or almost three times the 1970 volume. This would represent about 59 percent of all nuisance plastic in the disposal area.

As a general rule, scrap plastic has to be used in an end application having broader specification requirements than the product yielding the scrap. The fabrication of bottles, film of high quality, and certain coatings requires resin with tightly controlled specifications. In contrast, many plastic products made by molding or extrusion, whether they are housewares or pipe, use resin having a relatively broader specification range. Thus, scrap from plastic bottles, though difficult to recycle as bottles, can be used for pipe, siding, and a variety of structural products.

Scrap is being used to make a number of products today, and it is believed that if more secondary resin is made available at a sufficiently low price, new applications will develop.

SUMMARY OF THE INVENTION

Therefore, in accordance with the invention claimed, a new form of product is provided along with a method or procedure for producing it from discarded nuisance plastic objects and a select group of additives including generally available sand, sodium chloride, sodium hydrogen carbonate, animal fats and/or oils.

It is, therefore, one object of this invention to provide a new and useful fabricating material or composition of matter made from discarded nuisance plastic objects.

Another object of the invention is to provide such a material, the production of which may utilize most types of used nuisance plastics including both thermoplastics and thermosetting plastic materials.

A further object of the invention is to provide in such a material certain characteristics which for some applications are superior to the characteristics of the original plastic materials incorporated, one such improved characteristics being a capability of the material to receive a nail or other similar fastener without fracture.

A still further object of the invention is to provide such a material which retains many if not all of the desirable characteristics of the original material including resistance to corrosion by weather, water or acids, flexibility, wearability, a smooth and glossy surface, and a capability to be worked by the usual means employed for plastics including molding, casting, extrusion, laminating and calendering.

A still further object of the invention is to provide such a material which may be readily produced through the combination of waste plastic bodies with such other inexpensive materials such as table salt (NaCl), bicarbonate of soda (NaHCO$_3$), and sand (silicon dioxide) through simple and inexpensive process.

Yet another object of the invention is to provide a processing method for such an improved material which prevents the burning and vaporization of the plastic materials during the combining process.

Further objects and advantages of the invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing, in which:

FIG. 1 is a flow diagram of the procedure claimed for the production of the reclaimed nuisance plastic material of this invention.

DESCRIPTION OF THE PREFERRED EMBODIMENT

Referring more particularly to the drawing by characters of reference, FIG. 1 illustrates diagramatically the process claimed for the production of the reclaimed nuisance plastic material of the invention, functional blocks comprising a melting tank 10 with its built-in agitator 11, a fat or oil storage tank 12, a grinder/shredder 13, a sand hopper 14, a source of heat energy 15, a bulk casting station 16, and a final fabrication station 17.

In the operation of the process claimed, fat or oil is first delivered to tank 10 from storage tank 12. Any of a variety of fats or oils may be employed, including animal fats or petroleum products. The fat or oil charge within tank 10 is then raised to approximately 300° Fahrenheit under atmospheric conditions, the maximum temperature being not especially critical and limited to a safe level by the boiling point of the particular fat or oil employed.

Waste or discarded nuisance plastic objects and materials 18 comprising low-density polyethylene (LDPE), high-density polyethylene (HDPE), polypropylene, Styrene polymers and polyvinylchloride (PVC) are passed through the grinder/shredder 13 and thence into the heated charge of fat or oil in tank 1. A quantity of commonly available mineral sand mixture 19 such as silicon dioxide, from hopper 14 is also added to tank 10, the mixture 19 including any of a variety of filter materials including preferably a quantity of sand 21, sodium chloride, NaCl (table salt) 22 and small quantity of sodium hydrogen carbonate (NaHCO$_3$) bicarbonate of soda 23. Other filler or building materials may be included or substituted for the sand including dried and shredded vegetable fiber, metal shavings, sawdust and the like, the particular materials being selected in accordance with properties desired in the end product.

The total charge of the above mentioned materials including the fat or oil, the ground or shredded nuisance plastic material, the table salt (NaCl), bicarbonate of soda (NaHCO$_3$) and the sand or other bulk filler material is then stirred continuously within tank 10 by an appropriately designed agitator 11. While both thermoplastic and thermosetting plastic materials are accepted from shredder 13, it is essential that an appropriate quantity of thermoplastic materials be included as such materials constitute the binder for the end product. As the charge within tank 10 is heated and stirred under atmospheric conditions the shredded thermoplastic materials are melted and thoroughly mixed with the other materials. The fat or oil aids in the melting process by facilitating the even distribution of heat from source 15 and in limiting the maximum temperature throughout, thereby preventing burning or localized excessive temperatures. By virtue of the temperature control thus afforded and also by virtue of the surface layer of fat or oil covering the heated and melting plastic charge, vaporization and oxidation of such vapors is effectively prevented.

Once the mixture of plastic materials, sand and other additives is thoroughly mixed and the plastic has melted, the slurry mixture is poured into molds at station 16. The mold employed may be designed for the production of bulk material for later use as a raw material for the production of a variety of products at another final fabrication station 17, or the casting station 16 may be utilized to produce an end product such as patio bricks, wall panels, floor tile etc.

Relative quantities of shredded plastic, sand and other additives employed in the initial practice of the invention are given below:

½ cup of animal fat is placed into an open to atmosphere iron container and then adding:

2 gallons of dry shredded thermoplastic nuisance plastic materials,

½ cup of sand (silicon dioxide) which includes iron and manganese, the iron and manganese being impurities, 2 tablespoons of sodium chloride (NaCl), 2 tablespoons of sodium hydrogen carbonate (NaHCO$_3$).

The table salt (NaCl) appears to enhance the surface quality of the finished product, giving it a smooth and glossy finish while the baking soda (NaHCO$_3$) serves as a flame retardant both during the process and in the end product.

This mixture is brought to a melting point at approximately 300° Fahrenheit with constant agitation until it becomes a pourable slurry. After the pourable slurry is poured into a mold, 400 lb. pressure per square inch is applied. The hot melted slurry in the mold cools within approximately 20 minutes under atmospheric conditions.

This material in the presence of the lubricant is not a pourable slurry when not heated.

The end product is a material having certain desirable characteristics not exhibited by the original plastic materials. It can be fastened together or secured to other structures by means of nails or similar fasteners. The nails may be driven directly into the material without causing it to crack or split apart. The material is strong, resilient and water resistant. The bulk material or trimmings from it may be remelted and used again, if desired.

For specific physical characteristics including texture, strength, flexibility etc. the waste plastic bodies may first be sorted and incorporated in appropriate ratios. Where a level of thermal insulation is desired, for example, a high ratio of certain thermosetic plastic materials may be employed.

The process is simple and inexpensive, requiring no precise control of temperature, operating pressures or material quantities and also requiring no expensive additives such as the resins typically required in the production of plastic materials.

The invention serves a number of important needs presently recognized by our society: It provides a means for the disposal of waste nuisance plastic materials which it recovers for re-use and is thus effective in the conversion of materials and of the energy utilized in their original production.

Although but a single embodiment of the present invention has been illustrated, and described, it will be apparent to those skilled in the art that various changes and modifications may be made therein without departing from the spirit of the invention or from the scope of the appended claims.

What is claimed is:

1. A method of reclaiming nuisance plastic material comprising the steps of:
    heating a quantity of animal fat in a container,
    adding shredded thermoplastic nuisance material to said heating animal fat in sufficient quantity such that the animal fat forms a lubricant and a surface covering for the heating plastic material,
    adding a sufficient quantity of silica sand containing iron and manganese as impurities and sodium chloride to provide a smooth and glossy finish to the heating plastic material,
    adding a sufficient quantity of sodium hydrogen carbonate to retard flaming of the heating plastic material,
    agitating the heating plastic material to cause uniform heating thereof,
    heating the plastic material until the heated plastic material reaches a molten slurry condition so that it may be poured into a mold, and pouring the molten plastic material into a mold.

2. The method set forth in claim 1 wherein:
    two gallons of said thermoplastic material are heated to a pourable state in the presence of said animal fat,
    one half of a cup of said sand and two tablespoons of said sodium chloride and two tablespoons of said sodium hydrogen carbonate are dispersed throughout said heated thermoplastic material.

3. A composition of matter comprising:
    a thermoplastic material heated to a pourable state in the presence of a lubricant,
    silica sand and sodium chloride dispersed throughout the heated thermoplastic material,
    said sand containing iron and manganese impurities, and
    sodium hydrogen carbonate dispersed throughout the heated thermoplastic material,
    whereby the composition is provided with a smooth, glossy appearance when hardened.

* * * * *